US010220666B2

(12) United States Patent
Kuroda

(10) Patent No.: US 10,220,666 B2
(45) Date of Patent: Mar. 5, 2019

(54) LINK ARM MEMBER

(71) Applicant: NHK SPRING CO., LTD., Kanagawa (JP)

(72) Inventor: Shigeru Kuroda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 15/518,422

(22) PCT Filed: Sep. 28, 2015

(86) PCT No.: PCT/JP2015/077295
§ 371 (c)(1),
(2) Date: Apr. 11, 2017

(87) PCT Pub. No.: WO2016/067798
PCT Pub. Date: May 6, 2016

(65) Prior Publication Data
US 2017/0313154 A1 Nov. 2, 2017

(30) Foreign Application Priority Data

Oct. 28, 2014 (JP) .................................. 2014-219039

(51) Int. Cl.
*B60G 7/00* (2006.01)
*F16C 7/02* (2006.01)
(Continued)

(52) U.S. Cl.
CPC ......... *B60G 21/0551* (2013.01); *B60G 7/005* (2013.01); *B60G 21/055* (2013.01);
(Continued)

(58) Field of Classification Search
CPC .... B60G 2206/8101; B60G 2204/1224; B60G 2204/422; B60G 21/0551; B60G 7/005
See application file for complete search history.

(56) References Cited

U.S. PATENT DOCUMENTS 1,817,529 A 8/1931 Skillman
5,009,538 A 4/1991 Shirai et al.
(Continued)

FOREIGN PATENT DOCUMENTS

DE 10 2010 041 790 A1 4/2012
EP 0 462 394 A1 12/1991
(Continued)

OTHER PUBLICATIONS

International Search Report and Written Opinion of the International Search Report for PCT/JP2015/077295 dated Nov. 24, 2015.
(Continued)

*Primary Examiner* — Drew J Brown
(74) *Attorney, Agent, or Firm* — Kenealy Vaidya LLP

(57) ABSTRACT

A link arm member of the present invention is used in a vehicle for connecting a suspension and a stabilizer, and includes: a support bar that is sealed by plastically deforming a hollow metal pipe at both ends thereof; and a housing part made of resin that is arranged at each end of the support bar and has a receiving hole for receiving a ball part of a ball stud to which the suspension or the stabilizer is fixed, wherein the housing part is formed by insert molding with the support bar.

6 Claims, 11 Drawing Sheets

(51) Int. Cl.
*F16C 11/06* (2006.01)
*B60G 21/055* (2006.01)

(52) U.S. Cl.
CPC .......... *F16C 7/026* (2013.01); *F16C 11/0619* (2013.01); *F16C 11/0671* (2013.01); *B60G 2204/1224* (2013.01); *B60G 2204/422* (2013.01); *B60G 2206/7101* (2013.01); *B60G 2206/71043* (2013.01); *B60G 2206/8101* (2013.01); *F16C 2208/02* (2013.01); *F16C 2208/60* (2013.01); *F16C 2208/66* (2013.01); *F16C 2220/04* (2013.01); *F16C 2240/60* (2013.01); *F16C 2240/70* (2013.01); *F16C 2326/05* (2013.01)

(56) References Cited

U.S. PATENT DOCUMENTS

| | | | | |
|---|---|---|---|---|
| 5,165,306 | A | * | 11/1992 | Hellon ................ B60G 7/005 280/124.107 |
| 5,313,697 | A | | 5/1994 | Kanno et al. |
| 5,427,467 | A | * | 6/1995 | Sugiura .............. F16C 11/0638 403/133 |
| 5,615,967 | A | | 4/1997 | Hellon |
| 6,109,816 | A | * | 8/2000 | Iwasaki ................ B60G 7/005 403/122 |
| 6,691,366 | B1 | * | 2/2004 | Zimmer ................ B60S 1/245 15/250.14 |
| 9,393,850 | B2 | * | 7/2016 | Kuroda ............. B60G 21/0551 |
| 2007/0271793 | A1 | | 11/2007 | Mellis et al. |
| 2008/0193208 | A1 | | 8/2008 | Nordloh et al. |
| 2014/0027995 | A1 | | 1/2014 | Kuroda |
| 2015/0001824 | A1 | * | 1/2015 | Kuroda ................ B60G 7/005 280/124.106 |
| 2015/0151605 | A1 | | 6/2015 | Kuroda |
| 2016/0229247 | A1 | * | 8/2016 | Kuroda ................ B60G 7/001 |

FOREIGN PATENT DOCUMENTS

| | | |
|---|---|---|
| EP | 1 217 233 A1 | 6/2002 |
| EP | 2 642 141 A1 | 9/2013 |
| GB | 997 836 A | 7/1965 |
| GB | 1 121 004 A | 7/1968 |
| JP | 3-66913 A | 3/1991 |
| JP | 4-356256 A | 12/1992 |
| JP | 08127220 A * 5/1996 ......... B60G 21/0551 |
| JP | 2009-501885 A | 1/2009 |
| JP | 2011-247338 A | 12/2011 |
| JP | 2014-855 A | 1/2014 |
| KR | 20140023351 A | 2/2014 |
| WO | 2006/127707 A2 | 11/2006 |

OTHER PUBLICATIONS

Korean Office Action for the related Korean Patent Application No. 10-2017-7009279 dated Apr. 27, 2018.
Extended European Search Report for the related European Application No. 15853982.5 dated May 28, 2018.

* cited by examiner

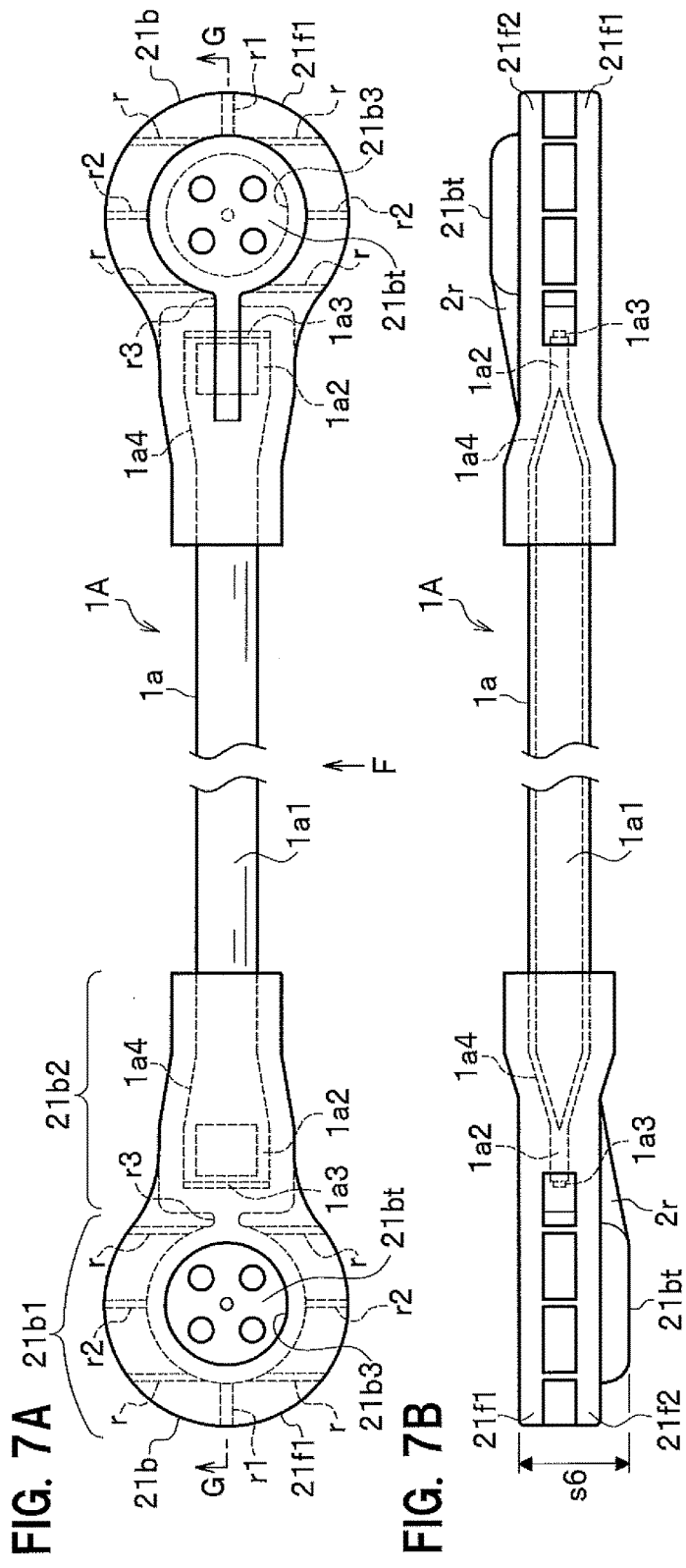
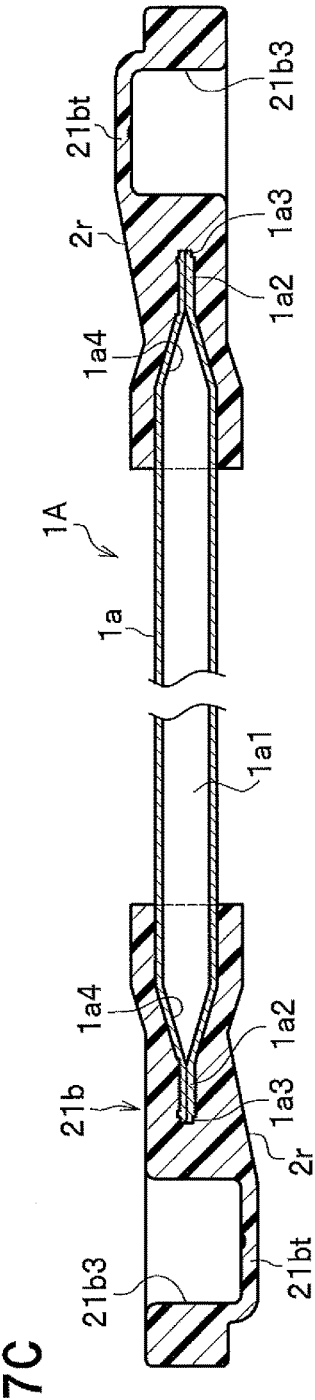
FIG. 7A
FIG. 7B
FIG. 7C

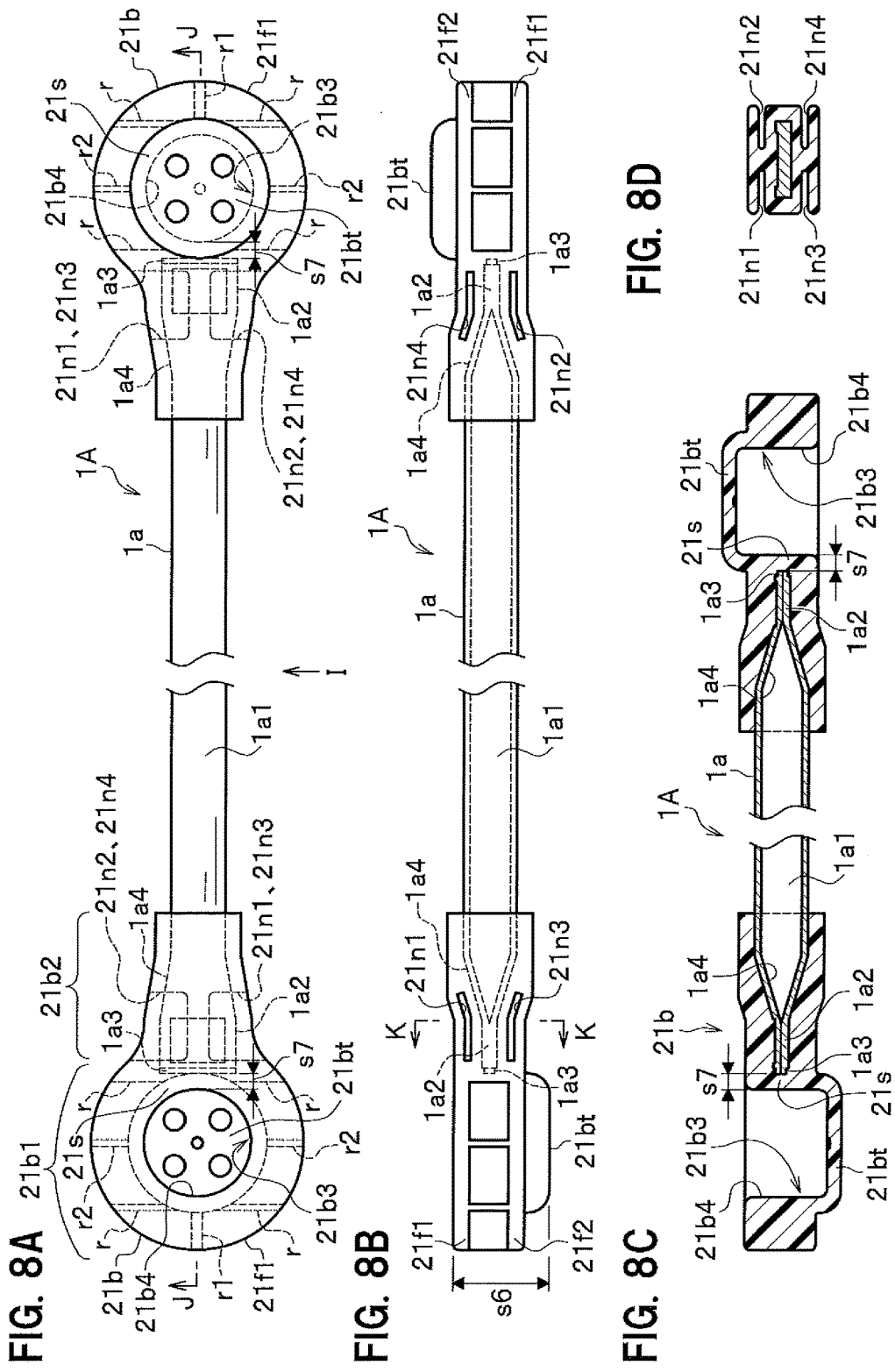

LINK ARM MEMBER

CROSS-REFERENCE TO RELATED APPLICATION

This application is a U.S. National Stage Application under 35 U.S.C § 371 of International Patent Application No. PCT/JP2015/077295 filed 28 Sep. 2015, which claims the benefit of priority to Japanese Patent Application No. 2014-219039 filed 28 Oct. 2014, the disclosures of all of which are hereby incorporated by reference in their entireties.

TECHNICAL FIELD

The present invention relates to a link arm member that connects a suspension or a strut with a stabilizer.

BACKGROUND ART

Conventionally, a vehicle includes a suspension and a stabilizer, as described in Japanese Patent Application Publication No. 2011-247338, for restraining variation in position of a wheel. The suspension absorbs, and reduces, impacts and vibrations transmitted from a road surface to a vehicle body. The stabilizer increases rigidity of the vehicle body against rolling (rigidity against torsion) caused by vertical movement of the right and left wheels. The suspension is connected with the stabilizer via a stabilizer link.

SUMMARY OF THE INVENTION

Problems to be Solved

Incidentally, every component has been required to have reduced weight in recent years for reducing the weight of the vehicle. Accordingly, the stabilizer link is also required to have reduced weight. The stabilizer link is formed to have one connecting part to be fixed to the suspension and the other connecting part to be fixed to the stabilizer, which are arranged at both ends of a support bar. That is, the support bar connects the two connecting parts to constitute the stabilizer link. As the support bar is a solid steel (steel bar), its weight is heavier than that of stabilizer link made of resin or aluminum.

This explains why a stabilizer link made of resin has been developed. FIG. 13 is a front view of a conventional resin stabilizer link. A resin stabilizer link 101 includes a support bar 102 in the center, and a casing 103 that is connected to each end of the support bar 102. The stabilizer link 101 is formed by injection molding. The position of an injection gate of the stabilizer link 101 is located in the center in the longitudinal direction. FIG. 13 shows a state of ball studs 109 being connected to the casings 103.

FIGS. 14A and 14B are cross-sectional views taken along a line X-X in FIG. 13, showing exemplary dimensions. The support bar 102 includes a center plate 102a, upper and lower wings 102b, 102c, and support plates 102d. The upper and lower wings 102b, 102c are formed to continue to the upper and lower sides of the center plate 102a, respectively. The support plates 102d join to the upper and lower wings 102b, 102c and the center plate 102a to form reinforcing members.

The upper and lower wings 102b, 102c each have a plate thickness of 4.2 mm. The center plate 102a has a plate thickness of 3.2 mm. The support plate 102d has a plate thickness of 2.2 mm. The support bar 102 of the resin stabilizer link 101 has an I-shaped cross-section, as shown in FIGS. 14A and 14B. In this case, Iy (second moment of area about the Y-axis shown in FIG. 14B) is significantly lower than Ix (second moment of area about the X-axis) due to a difference in cross-sectional shapes about the axes.

In order to equalize Iy and Ix, the width of 24.1 mm in FIG. 14A needs to be 29.7 mm, which is 28 mm or more, as shown in FIG. 14(b). Under the condition of nylon 66 (containing glass fiber 30%), room temperature, and water absorption rate of 1.75%, an all-resin support bar has a flexural modulus of approximately 6 GPa. In contrast, a steel support bar has a longitudinal elastic modulus of approximately 210 GPa.

Therefore, on the condition that the same axial load is applied, an all-resin support bar will stretch approximately 35 times more than a steel support bar. The displacement amount (elastic lift amount) with respect to the load is rated for using the stabilizer link 101, and the all-resin support bar may fail to satisfy the elastic lift amount due to its stretch level in the axial direction.

The present invention is intended in view of the above situation to provide a link arm member that has small displacement amount and light weight yet high strength.

Solution to Problems

In order to solve the above problem, a link arm member of a first aspect of the present invention is used in a vehicle for connecting a suspension and a stabilizer, and includes: a support bar that is sealed by plastically deforming a hollow metal pipe at both ends thereof, and a housing part made of resin that is arranged at each end of the support bar and has a receiving hole for receiving a ball part of a ball stud to which the suspension or the stabilizer is fixed, wherein the housing part is formed by insert molding with the support bar.

According to the link arm member of the first aspect, the housing part is formed by insert molding with the support bar to allow the link arm member to have light weight yet to satisfy the displacement amount with respect to the load.

A link arm member of a second aspect of the present invention is the link arm member of the first aspect, wherein the support bar is formed to have a flat plate part in a flat plate shape at each end thereof.

According to the link arm member of the second aspect, the support bar has the flat plate part spreading like a spatula to restrain or prevent the housing from coming off the support bar. In addition, if there is a phase difference between one housing and the other housing, one flat plate part is referenced to form the other flat plate part, to facilitate manufacturing.

A link arm member according to a third aspect of the present invention is the link arm member of the second aspect, wherein the support bar includes a recess on the flat plate part, or in the vicinity thereof, that recesses in part of a flatly-extending surface of the flat plate part.

According to the link arm member of the third aspect, the support bar includes the recess on the flat plate part, or in the vicinity thereof, that recesses in part of a flatly-extending surface of the flat plate part, to allow resin to permeate into the recess of the support bar so as to reinforce fixation of the support bar to the housing. This helps improve strength of the link arm member.

A link arm member according to a fourth aspect of the present invention is the link arm member according to the first aspect, wherein the support bar includes a first sealing part at each edge thereof that is plastically deformed for sealing so as to have a thickness approximately 10% to 35% thinner than the wall thickness of a pipe material to be deformed.

According to the link arm member of the fourth aspect, the support bar of the link arm member includes the first sealing part at each edge thereof, which has a thickness approximately 10% to 35% thinner than the wall thickness of the pipe material to be deformed, to allow the support bar to be surely sealed.

A link arm member according to a fifth aspect of the present invention is the link arm member according to the first aspect, wherein the support bar includes a second sealing part at each end thereof that is in a shape of being bent zigzag one or more times.

According to the link arm member of the fifth aspect, the support bar includes the second sealing part at each end thereof, which is in a shape of being bent zigzag one or more times, to allow the support bar to be surely sealed.

A link arm member according to a sixth aspect of the present invention is the link arm member according to the first aspect, wherein the housing includes flange parts that are annularly formed to continue outward from the peripheral wall defining the receiving hole.

According to the link arm member of the sixth aspect, the housing includes flange parts that are annularly formed to continue outward from the peripheral wall defining the receiving hole, to allow the housing to have improved material strength and fatigue strength (or fatigue limit). This helps improve reliability on durability.

A link arm member according to a seventh aspect of the present invention is the link arm member according to the first aspect, wherein the housing is formed to have a smaller thickness of resin, around the peripheral wall of the receiving hole, with the increasing distance from the edge of the support bar toward the center thereof in the longitudinal direction, and to have approximately the same thickness at a position approximately 2 mm or more apart from the edge inward as that of the resin covering the support bar from that position inward to the end of the housing.

According to the link arm member of the seventh aspect, joining strength can be improved between the resin around the peripheral wall of the receiving hole of the housing and the resin covering the support bar.

A link arm member according to an eighth aspect of the present invention is the link arm member of the first aspect, wherein the housing includes a reinforcing rib like a brace between the bottom wall of the receiving hole and the resin covering the support bar.

According to the link arm member of the eighth aspect, the housing includes the reinforcing rib like a brace between the bottom wall of the receiving hole and the resin covering the support bar, so as to improve joining strength between the resin forming the receiving hole and the resin covering the support bar.

A link arm member according to a ninth aspect of the present invention is the link arm member according to the first aspect, wherein the link arm member has a gap of approximately 2 to 3 mm between the resin forming the peripheral wall of the receiving hole and the resin covering the support bar.

According to the link arm member of the ninth aspect, the link arm member has a gap of approximately 2 to 3 mm between the resin forming the peripheral wall of the receiving hole and the resin covering the support bar, to prevent the strength of the resin forming the peripheral wall of the receiving hole and the strength of the resin covering the support bar from being reduced.

The link arm member according to a tenth aspect of the present invention is the link arm member of the first aspect, wherein the shortest distance between the inner peripheral wall surface of the receiving hole and the edge of the support bar is approximately 3 to 4 mm at one or the other end of the support bar, and the space therebetween is filled with resin.

According to the link arm member of the tenth aspect, the space between the inner peripheral wall surface of the receiving hole and the edge of the support bar is filled with resin to have the shortest distance of approximately 3 to 4 mm, i.e., both are close to each other, to allow a load (external force) received in the receiving hole to be directly transmitted by the support bar having high strength. In addition, the shortest distance being as short as approximately 3 to 4 mm allows the resin therebetween to have a small bending stress and/or distortion due to the load (external force) received in the receiving hole. This helps prolong the life of the link arm member.

A link arm member according to an eleventh aspect of the present invention is the link arm member of the second aspect, wherein a boundary part between the flat plate part and a pipe-shaped part on the center side of the support bar is formed to have a curvature such that a boundary on the center side in the transverse direction of the support bar protrudes toward the center side in the longitudinal direction thereof.

According to the link arm member of the eleventh aspect, the boundary on the center side in the transverse direction of the support bar, between the flat plate part and the pipe-shaped part on the center side of the support bar, is formed to have a curvature so as to protrude toward the center side in the longitudinal direction of the support bar, to ease stress concentration. This helps improve material strength and fatigue strength (or fatigue limit) of the support bar of the link arm member. Accordingly, reliability on durability is improved.

A link arm member according to a twelfth aspect of the present invention is the link arm member of the eleventh aspect, wherein the boundary part is inclined at an angle of 15 to 60 degrees with respect to the flat plate part.

According to the link arm member of the twelfth aspect, the boundary part is inclined at an angle of 15 to 60 degrees with respect to the flat plate part, to allow a stress to be transferred from the pipe-shaped part to the flat plate part over a relatively short distance, thereby restraining stress concentration. This helps maintain reliability of the housing.

A link arm member according to a thirteenth aspect of the present invention is the link arm member of the first aspect, wherein the housing contains a reinforcing material in the resin in an amount between 25% by weight and 60% by weight, inclusive.

According to the link arm member of the thirteenth aspect, the housing contains the reinforcing material in the resin in an amount between 25% by weight and 60% by weight, inclusive, to allow the link arm member to have light weight yet improved strength. In addition, operating life of a molding machine is not affected.

Advantageous Effects of the Invention

The present invention provides a link arm member that has small displacement amount and light weight yet high strength.

BRIEF DESCRIPTION OF DRAWINGS

FIG. 7A is a top view of a stabilizer link of a second embodiment; FIG. 7B is a view as seen in the direction of an arrow F in FIG. 7A; FIG. 7C is a cross-sectional view taken along a line G-G in FIG. 7A;

FIG. 8A is a top view of a stabilizer link of another example of the second embodiment; FIG. 8B is a view as seen in the direction of an arrow I in FIG. 8A;

FIG. 8C is a cross-sectional view taken along a line J-J in FIG. 8A; FIG. 8D is a cross-sectional view taken along a line K-K in FIG. 8A;

DETAILED DESCRIPTION

First Embodiment

Hereinafter, embodiments of the present invention will be described in detail with reference to the drawings as appropriate.

Figure 1:
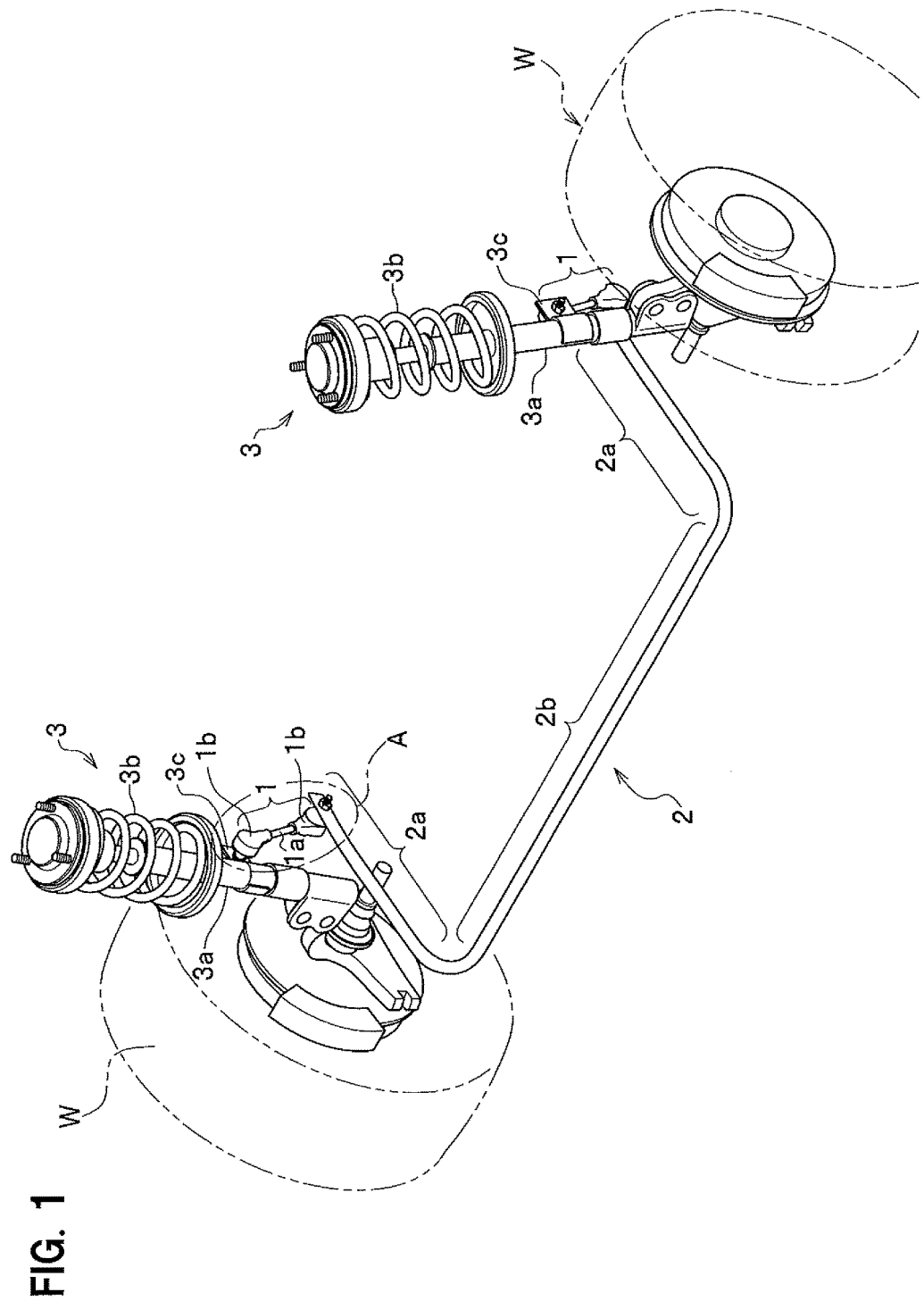
FIG. 1 is a perspective view of a stabilizer link according to a first embodiment of the present invention connecting a suspension and a stabilizer.

FIG. 1 is a perspective view of a stabilizer link according to a first embodiment of the present invention connecting a suspension and a stabilizer. The stabilizer link (link arm member) 1 of the first embodiment is one of components used for reducing variation in position of wheels W while a vehicle (not shown) is traveling.

A vehicle (not shown) includes wheels W used for traveling at the front and rear. The wheel W is fixed to a vehicle body (not shown) via a suspension 3. The suspension 3 includes a suspension damper 3a, and a coil spring 3b that is arranged about the suspension damper 3a. The suspension damper 3a rotatably supports the wheel W, and damps vibration of the wheel W by a viscous damping force or the like.

The coil spring 3b is mounted between the suspension damper 3a supporting the wheel W and the vehicle body. The coil spring 3b buffers the impact applied by the wheel W to the vehicle body, with an elastic force or elastic energy of the spring.

Such a viscous damping force by the suspension damper 3a and such an elastic force by the coil spring 3b are exerted on the suspension 3 to damp vibration and/or impact to be transmitted to the vehicle body.

A stabilizer 2 is connected between the right and left suspensions 3 for restraining by torsional stiffness the displacement of the right and left suspensions 3. The stabilizer 2 increases the rigidity against rolling of the vehicle body (rigidity against torsion) caused by the displacement of the right and left wheels W to restrain the rolling of the vehicle (not shown).

The stabilizer 2 includes a torsion arm 2a and a torsion bar 2b. The stabilizer 2 is formed with a rod-shaped spring steel that is bent as appropriate to fit the shape of the vehicle. The stabilizer 2 extends toward the direction from one suspension damper 3a to the other suspension damper 3a, which respectively support a right and left pair of wheels W. The right and left suspension dampers 3a are connected to the stabilizer 2 via a pair of right and left stabilizer links 1, respectively.

A most tortured part of the stabilizer 2, such as when the vehicle turns, is the torsion bar 2b in the center due to the difference between the stretch amounts of the two suspension dampers 3a, to restrain the rolling of the vehicle by the elastic force of restoring the torsion.

Figure 2:
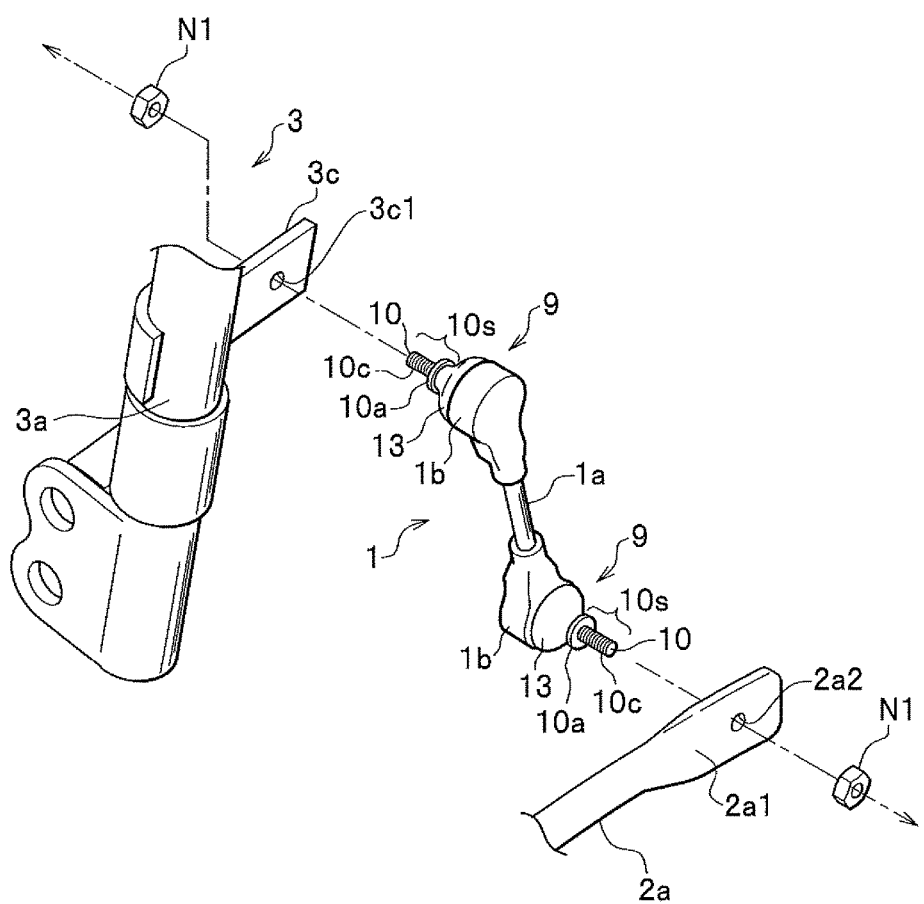
FIG. 2 is an exploded perspective view of an area A in FIG. 1 in a disassembled state.

FIG. 2 is an exploded perspective view of an area A in FIG. 1 in a disassembled state. The stabilizer link 1 is formed to have a housing 1b at each end of a support bar 1a in the center. The housing 1b constitutes a connecting part 9. A ball stud 10 is tiltably housed in the housing 1b of the connecting part 9. The connecting part 9 includes a dust boot 13 for preventing foreign matter from entering into the housing 1b.

Then, the ball stud 10 in one connecting portion 9 is fastened and fixed to a bracket 3c to which the suspension damper 3a is fixed, while the ball stud 10 in the other connecting portion 9 is fastened and fixed to the torsion arm 2a of the stabilizer 2.

The bracket 3c is fixed to the suspension damper 3a by spot welding or the like. The bracket 3c has a flat plate part facing toward the torsion arm 2a (the center side of the vehicle which is not shown) of the stabilizer 2. An attachment hole 3c1 is bored in the flat plate part of the bracket 3c. A stud part 10s of one ball stud 10 is inserted into the attachment hole 3c1 until a flange part 10a, which peripherally spreads, reaches the attachment hole 3c1. Then, a nut N1 is screwed onto a male screw 10c which is threaded on the stud part 10s of the ball stud 10 inserted through the attachment hole 3c1.

In addition, an attachment hole 2a2 is bored in a sealing part 2a1 at an end of the torsion bar 2a of the stabilizer 2. For example, the end of the torsion bar 2a and the vicinity thereof are crushed to have a flat shape which faces the suspension damper 3*a*, as shown in FIG. 2, to form the sealing part 2*a*1. Then, the attachment hole 2*a*2 is bored in the sealing part 2*a*1.

The stabilizer 2 is inserted through the attachment hole 2*a*2 onto the stud part 10*s* of the other ball stud 10 to the flange part 10*a*. Then, the nut N1 is screwed onto the male thread 10*c* of the stud part 10*s* of the ball stud 10 which has been inserted through the attachment hole 2*a*2 of the stabilizer 2, to fix the stabilizer 2 to the stabilizer link 1.

Thus, the stabilizer link 1 is fixed to the suspension damper 3*a* of the suspension 3 and the torsion arm 2*a* of the stabilizer 2 via respective ball studs 10 at both ends of the support bar 1*a*. The two ball studs 10 are tiltably supported by the respective housings 1*b* at both ends of the stabilizer link 1. Accordingly, the stabilizer link 1 is movable with respect to the suspension damper 3*a* of the suspension 3 and the torsion arm 2*a* of the stabilizer 2.

As described above, the stabilizer link 1 is a link arm member that is fixed to the stabilizer 2 and the suspension 3 to connect the stabilizer 2 with the suspension 3.

Figure 3:
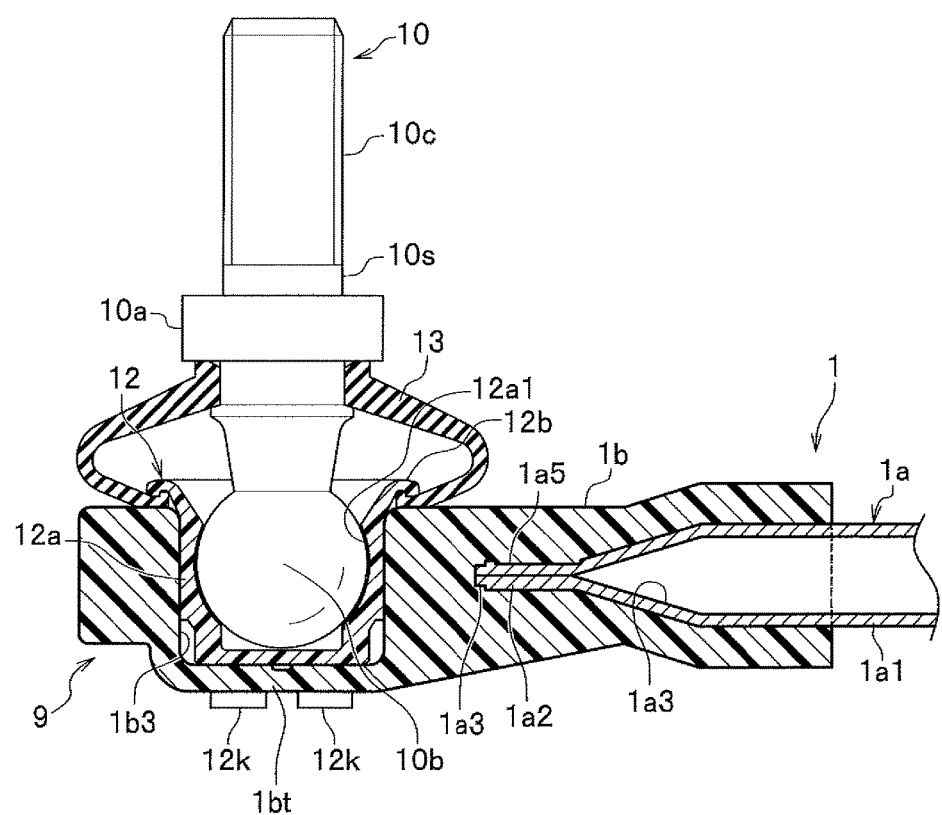
FIG. 3 is a cross-sectional view of a structure around a housing and a ball stud of a stabilizer link.

FIG. 3 is a cross-sectional view of a structure around the housing and the ball stud of the stabilizer link. The connecting part 9 inclusive of the housing 1*b* is arranged at each end of the support bar 1*a* of the stabilizer link 1. In other words, the connecting part 9 has the housing 1*b* in a cup shape which is fixed to each end of the support bar 1*a*. Thus, the stabilizer link 1 includes the two connecting parts 9. The housing 1*b* is fixed to each end of the support bar 1*a* by insert molding. A ball seat 12 made of resin is housed inside the housing 1*b*.

The ball stud 10 has a substantially spherical ball part 10*b* and the stud part 10*s*. The stud part 10*s* extends toward a certain direction from the ball part 10*b*. The ball stud 10 has the ball part 10*b* received in the ball seat 12 to constitute the connecting part 9.

The ball seat 12 made of resin is composed of a main body part 12*a* and a flange part 12*b*, to have the main body part 12*a* received in the housing 1*b*. The main body part 12*a* of the ball seat 12 has a cup shape. The main body part 12*a* of the ball seat 12 is fixed in the housing 1*b* such as by hot pressure welding, adhesive bonding, or press fitting. Note that a description will be given in the present embodiment of a case where the main body part 12*a* of the ball seat 12 is fixed inside the housing 1*b* by hot pressure welding. The main body 12*a* has its welded parts 12*k* (see FIG. 3) welded with a bottom plate 1*bt*, which is under a housing hole 1*b*3 of the housing 1*b* and formed with holes 1*k*1 (see FIG. 4A), through the holes 1*k*1 so that the ball seat 12 is fixed to the housing 1*b*. An opening side of the main body part 12*a* peripherally expands outward to form the flange part 12*b*.

A housing space 12*a*1 is formed inside of the main body part 12*a* of the ball seat 12. Then, the ball part 10*b* of the ball stud 10 is rollably received in the housing space 12*a*1 of the ball seat 12. Additionally, the stud part 10*s* of the ball stud 10 integrally moves with the ball part 10*b*. Therefore, the ball stud 10 received in the ball seat 12 has the stud portion 10*s* to be tiltable with respect to the stabilizer link 1. In other words, the housing 1*b* of the stabilizer link 1 tiltably supports the ball stud 10 of the stabilizer link 1. As described above, the connecting part 9 includes the tiltable ball stud 10 composed of the stud part 10*s* and the ball part 10*b*, to constitute a ball joint structure.

The stud part 10*s* of the ball stud 10 is formed with the flange part 10*a* which peripherally spreads. A male screw 10*c* is threaded around an end of the stud part 10*s* which is located closer to an edge of the ball stud 10 than the flange part 10*a*.

With this configuration, the stud part 10*s* of the ball stud 10 arranged at one end of the support bar 1*a* is inserted, as shown in FIG. 2, into the attachment hole 3*c*1 bored in the bracket 3*c* of the suspension damper 3*a* up to the flange part 10*a*. In this state, the nut N1 is screwed onto the male screw 10*c* to fix the ball stud 10 to the suspension damper 3*a*.

In addition, the stud part 10*s* of the ball stud 10 arranged at the other end of the support bar 1*a* is inserted into the attachment hole 2*a*2 bored in the torsion arm 2*a* of the stabilizer 2 up to the flange part 10*a*. In this state, the nut N1 is screwed onto the male screw 10*c* to fix the ball stud 10 to the torsion arm 2*a* of the stabilizer 2.

Note that the direction toward which the stud part 10*s* of the stabilizer link 1 extends is appropriately determined according to the positional relationship between the suspension damper 3*a* (see FIG. 2) of the suspension 3 and the torsion arm 2*a* (see FIG. 2) of the stabilizer 2.

As shown in FIG. 3, the housing 1*b* and the flange part 12*b* of the ball seat 12 face each other in a state where the main body part 12*a* of the ball seat 12 is received in the housing 11. An edge side of the dust boot 13 is clamped by the housings 1*b* and the flange part 12*b* of the ball seat 12 which face each other.

The dust boot 13 is a hollow member made of an elastic body such as rubber. The dust boot 13 is a member that prevents foreign matter (such as dust) from entering into the housing 1*b* and/or the ball seat 12. The dust boot 13 is arranged around the ball stud 10 between the flange part 10*a* and the housing 1*b*. The dust boot 13 has two openings at positions facing each other. One opening is peripherally bent inward and sandwiched between the housing 1*b* and the flange part 12*b* of the ball seat 12 which face each other. The other opening of the dust boot 13 closely contacts with, and is fixed to, the stud portion 10*s* of the ball stud 10. The dust boot 13 is shaped so as not to hinder the stud portion 10*s* from tilting. For example, the dust boot 13 preferably has a shape of largely bulging outward.

<Stabilizer Link 1>

Figure 4A:
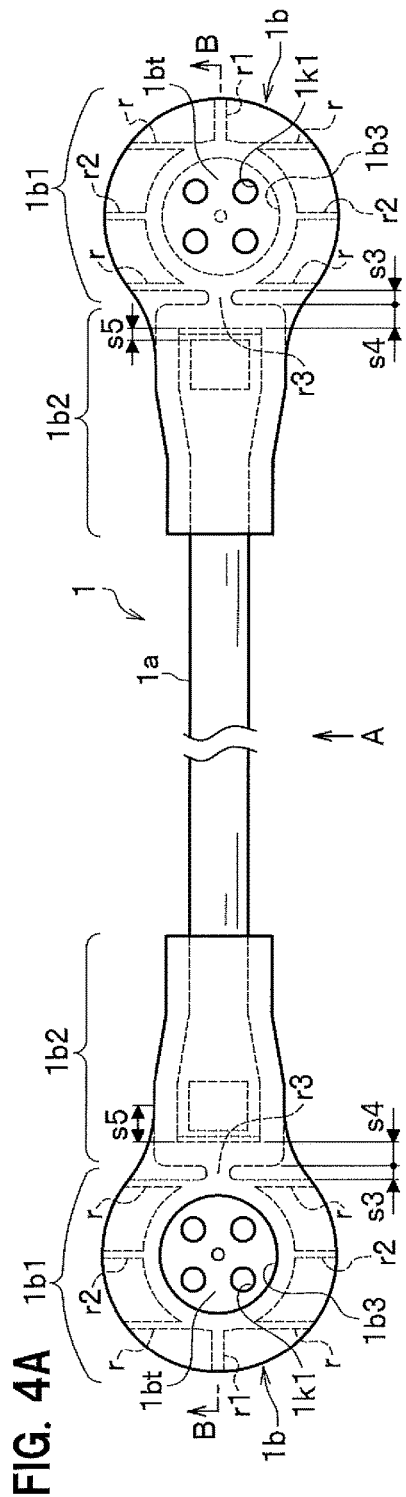
FIG. 4A is a top view of a stabilizer link 1.
Figure 4B:
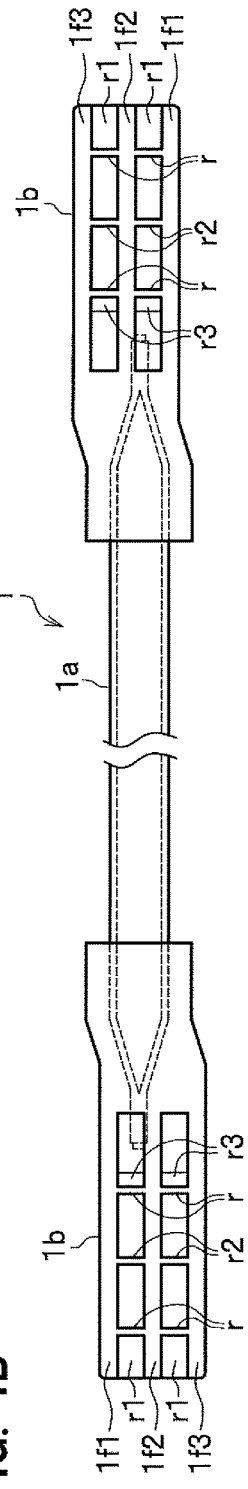
FIG. 4B is a view as seen in the direction of an arrow A in FIG. 4A.
Figure 4C:
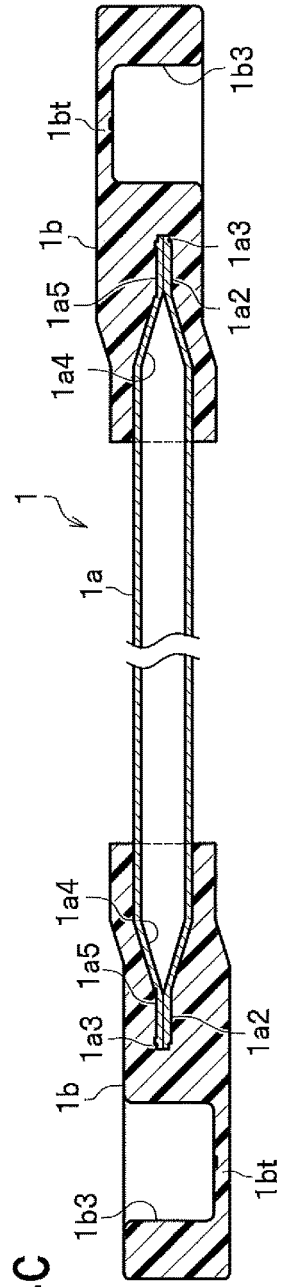
FIG. 4C is a cross-sectional view taken along a line B-B in FIG. 4A.

FIG. 4A is a top view of the stabilizer link 1, FIG. 4B is a view as seen in the direction of an arrow A in FIG. 4A, and FIG. 4C is a cross-sectional view taken along a line B-B in FIG. 4A. As described above, the stabilizer link 1 has a support bar 1*a* in the center and a housing 1*b* at each end. The support bar 1*a* is made of metal, and the housing 1*b* is made of resin. The support bar 1*a* and housing 1*b* of the stabilizer link 1 are integrally formed by insert molding.

<Support Bar 1*a*>

Figure 5A:
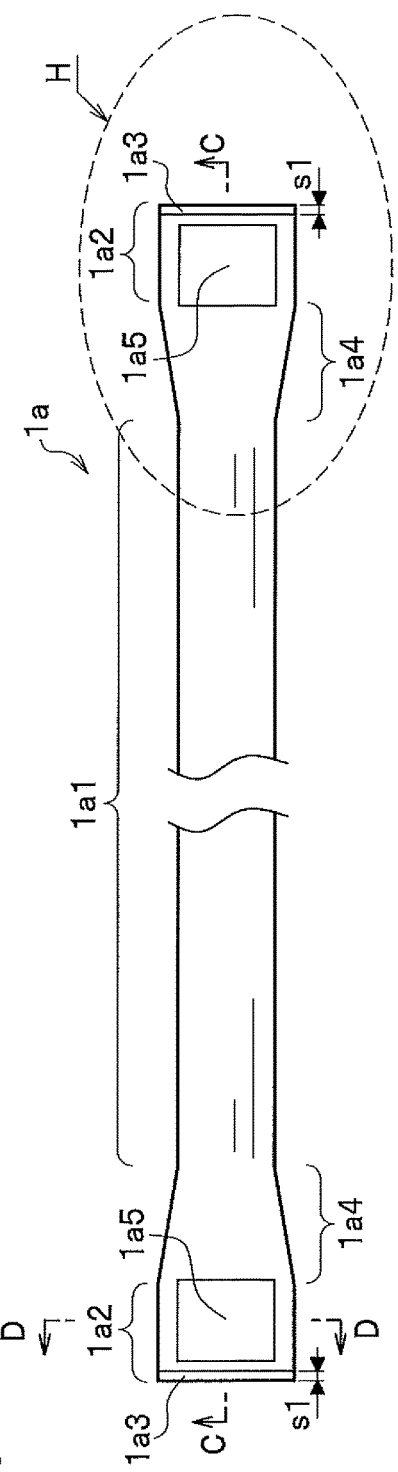
FIG. 5A is a top view of a support bar alone.
Figure 5B:
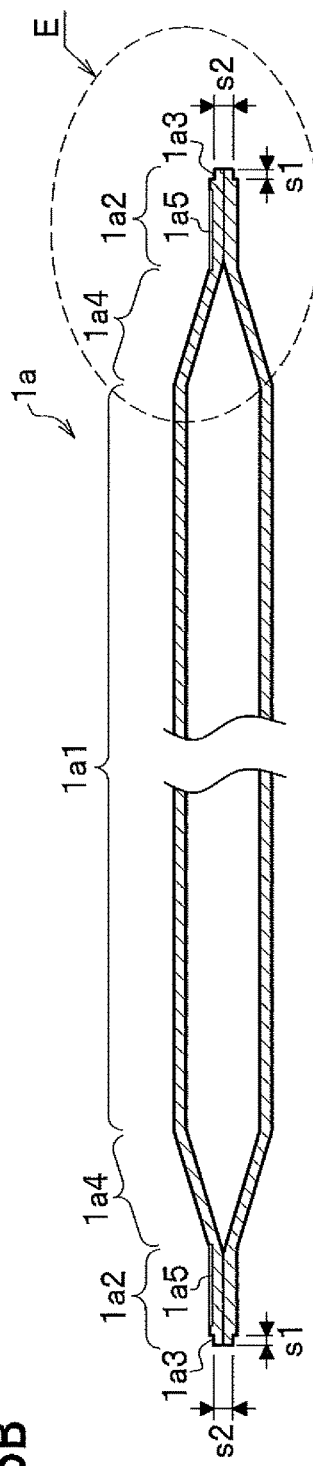
FIG. 5B is a cross-sectional view taken along a line C-C in FIG. 5A.
Figure 5C:
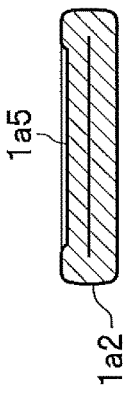
FIG. 5C is a cross-sectional view taken along a line D-D in FIG. 5A.

FIG. 5A is a top view of the support bar 1*a*, FIG. 5B is a cross-sectional view taken along a line C-C in FIG. 5A, and FIG. 5C is a cross-sectional view taken along a line D-D in FIG. 5A. The support bar 1*a* is formed using a hollow steel pipe. The support bar 1*a* is formed of a steel material such as spring steel, STK11A, STK13 A, or STK13C, but it is not limited thereto as long as it is a metal material such as steel and satisfies predetermined material strength and fatigue strength (or fatigue limit). For example, the support bar 1*a* may be made of aluminum, titanium, or other metal instead of steel.

The support bar 1*a* is formed such that a hollow pipe having a predetermined length is plastically deformed at each end into a flat plate shape and sealed. That is, the support bar 1*a* includes a hollow pipe part 1*a*1 in the center, a flat plate part 1*a*2 at each end, and a sealing part 1*a*3 at each edge. The hollow pipe part 1*a*1 is in a shape of a pipe material.

The flat plate part 1*a*2 is formed by pressing in a substantially flat plate shape at each end of the hollow pipe part 1*a*1. As a result, the flat plate part 1*a*2 of the support bar 1*a* spreads like a spatula with respect to the hollow pipe part 1*a*1 in the center.

Forming the flat plate parts 1*a*2 may cause a phase difference in the angle around the axis between the housings 1*b* to be arranged at both ends of the support bar 1*a*. For this case, after one end of a pipe material is pressed to form the support bar 1*a*, the position of the flat plate part 1*a*2 at this end is detected at the time of pressing the other end. Then, the pipe material is rotated by the angle of the phase difference to press the other end of the pipe material. Note that the stabilizer link 1 in FIGS. 4A, 4B, and 4C indicates the case of the phase difference being 180 degrees.

The sealing part 1*a*3 is formed by plastic deformation, in which the flat plate part 1*a*2 is crushed at an edge of each end, to have a sealed state, that is, an airtight state.

In other words, the support bar 1*a* has the sealing part 1*a*3 formed by the pipe material having a predetermined length being crushed at each edge. The support bar 1*a* runs from the sealing part 1*a*3, via the flat plate part 1*a*2 in a flat plate shape and a tapered part 1*a*4 leading to a pipe shape, to the hollow pipe part 1*a*1 in a pipe shape on the central side.

A dimension s1 from the edge of the sealing part 1*a*3 of the support bar 1*a* is set to approximately 0.5 to 3 mm. The thickness of the sealing part 1*a*3 is set to be 10% to 35% thinner than a thickness twice the thickness of the pipe material. That is, the sealing part 1*a*3 is formed by plastically deforming the pipe material so as to have a dimension of being approximately 10% to 35% thinner than the end-to-end thickness of the deformed pipe material, and then sealing (making airtight) the edge. This secures the sealing (airtight) property of the support bar 1*a*. For example, when a pipe material having a diameter of 10 mm and a thickness of 1.2 mm is used for the support bar 1*a*, a thickness s2 being 10% to 35% thinner than the thickness of 2.4 mm twice the thickness of the pipe material is set to 1.9 mm.

Figure 6A:
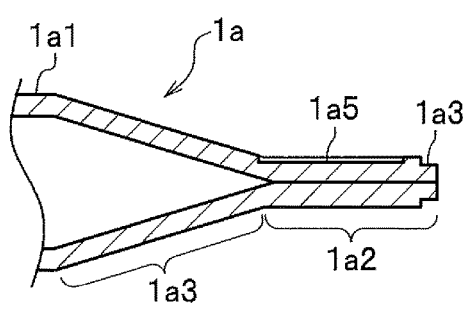
FIG. 6A is an enlarged view of an area E in FIG. 5B.
Figure 6B:
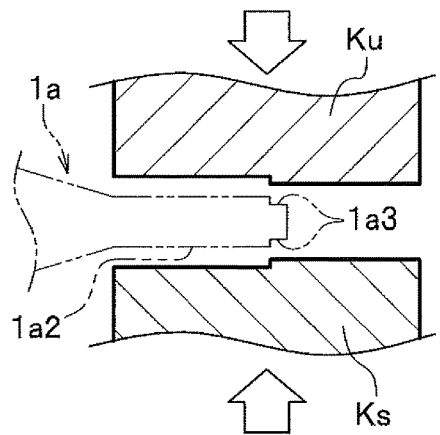
FIG. 6B is an enlarged view of the area E in FIG. 5B in a state of a flat plate part and a sealing part of the support bar being formed.

FIG. 6A is an enlarged view of an area E in FIG. 5B of the support bar, and FIG. 6B is an enlarged view of the area E in FIG. 5B in a state of the flat plate part and the sealing part of the support bar being formed. The sealing part 1*a*3 of the support bar 1*a* in FIG. 6A is formed, as shown in FIG. 6B, by using an upper die Ku and a lower die Ks to press a pipe material toward directions indicated by hollow arrows.

The flat plate part 1*a*2 formed at the end of the support bar is basically in a flat plate shape, but may have unfilled portions such as voids and/or misalignment at the time of molding due to a difference in linear expansion coefficients between a material of the support bar 1*a* and a resin material of the integrally molded housing 1*b*. The support bar 1*a* is gripped by resin forming the housing 1*b* because of molding shrinkage during insert injection in insert molding, but the gripping may fail, for example, if such a large force is applied to the support bar 1*a* that can not be gripped by the resin.

Then, the support bar 1*a* adopts the following structure. As shown in FIGS. 5A to 5C, a recess 1*a*5 having a concave shape is arranged in the flat plate part 1*a*2 having a flat plate shape, or in the vicinity thereof. The recess 1*a*5 may be pressed at the same time when the flat plate part 1*a*2 and the sealing part 1*a*3 are formed, or may be pressed after the flat plate part 1*a*2 is formed.

The presence of the recess lay allows the support bar 1*a* and the resin forming the housing 1*b* to be strongly fixed to each other. Thus, the pipe material formed to have the hollow pipe part 1*a*1, the flat plate part 1*a*2, and the sealing part 1*a*3 is cationically painted or plated as a single body. This completes manufacturing of the support bar 1*a* shown in FIGS. 5A to 5C.

<Housing 1*b*>

The housing 1*b* is preferably made of resin as described above and a reinforcing material is added in the resin. Engineering plastic such as PA66 (Polyamide 66), PA6 (Polyamide 6), PPS (Polyphenylenesulfide), and POM (Polyacetal) or super engineering plastic is used as the base material of the housing 1*b*. The engineering plastic is industrial plastic which has superior strength and a specific property such as heat resistance being improved. The super engineering plastic is an engineering plastics resin which has particularly superior property and can be used for a long time under high temperature. For example, FRP (fiber reinforced plastic), GRP (glass fiber reinforced plastic), CFRP (carbon fiber reinforced plastic), or the like is used.

As an example, fine fibers of fiberglass are mostly used as the reinforcing material. The content of the reinforcing material is desirably approximately 25% or more, considering reinforcing effect and avoiding the strength under high temperature (approximately 80° C.) from decreasing to 50% or less as compared with the strength under normal temperature (approximately 23° C.). Additionally, the upper limit is preferably approximately 60% in view of the life of an injection molding machine in terms of moldability. That is, the content of the reinforcing material is preferably approximately between 25% and 60%, inclusive. Note that the reinforcing material other than fiberglass may be used.

As shown in FIGS. 4A to 4C, in the present embodiment, the housing 1*b* on the other end of the support bar 1*a* is formed by inverting the same one as the housing 1*b* on one end, to make the housing 1*b* on one end have the same shape as that on the other end.

The housing 1*b* is formed in a shape that covers the sealing part 1*a*3, the flat plate part 1*a*2, the tapered part 1*a*4, and part of the hollow pipe part 1*a*1 of the support bar 1*a*. The housing 1*b* includes a receiving part 1*b*1 (see FIG. 4A) and a fixing part 1*b*2. The housing 1*b* has a thickness of 4 mm or less. Setting the thickness of the housing 1*b* to 4 mm or less prevents voids such as bubbles from being generated.

The receiving part 1*b*1 is formed to have the receiving hole 1*b*3 in a bottomed cylindrical shape in which the main body part 12*a* of the ball seat 12 and the ball part 10*b* of the ball stud 10 are received. The sealing part 1*a*3, the flat plate part 1*a*2, the tapered part 1*a*4, and part of the hollow pipe part 1*a*1 of the support bar 1*a* are fixed inside the fixing part 1*b*2. Three flange parts 1*f*1, 1*f*2, and 1*f*3 in a disc shape are formed in the receiving part 1*b*1 on the outer side of the peripheral wall around the receiving hole 1*b*3.

As shown in FIG. 4B, reinforcing ribs r1, r2, r3 radially arranged about the axial center of the flange parts 1*f*1, 1*f*2, 1*f*3 and reinforcing ribs "r" are formed for reinforcement between the flange parts 1*f*1, 1*f*2, 1*f*3 so as to connect the flange parts 1*f*1, 1*f*2, 1*f*3 with each other. The flange parts 1*f*1, 1*f*2, 1*f*3 and the reinforcing ribs r, r1, r2, r3 constitute a structure that can withstand external forces applied from the ball portion 10*b* of the ball stud 10.

The holes 1*k*1 are formed in the bottom plate 1*bt* of the receiving part 1*b*1 for welding (see 12*k* in FIG. 3) the main body part 12*a* of the ball seat 12. A gap having dimension s3 (see FIG. 4A) of approximately 2 to 3 mm is interposed between the resin (approximately 3 to 4 mm in thickness) covering the cylindrical surface of the receiving hole 1*b*3 of the receiving part 1*b*1 and the resin covering the edge of the sealing part 1*a*3 of the support bar 1*a*. This prevents the resin covering the edge of the sealing part 1*a*3 of the support bar 1a and the resin covering the cylindrical surface of the receiving hole 1b3 of the receiving part 1b1 from being reduced in thickness.

The edge of the sealing part 1a3 of the support bar 1a is covered with resin having a thickness s4 (see FIG. 4A) of approximately 3 to 4 mm. The resin forming the flange parts 1f1, 1f2, 1f3 and the reinforcing rib r3 smoothly continues from the receiving part 1b1 to the fixing part 1b2 to avoid stress concentration, and has approximately the same thickness as that of the resin covering the center side of the support bar 1a, for improving strength, at a position crossing the edge of the support bar 1a by a length of dimension s5 (approximately 2 mm or more) (see FIG. 4A) toward the center thereof. In this way, the resin forming the receiving part 1b1 (including the flange parts 1f1, 1f2, 1f3 and the reinforcing rib r3) continues to the resin forming the fixing part 1b2.

<Forming Stabilizer Link 1>

The support bar 1a subjected to the aforementioned surface treatment (see FIGS. 5A to 5C) is used to integrally fix the housings 1b by insert molding at both ends of the support bar 1a, to manufacture the stabilizer link 1. In a case where the injection molding die horizontally opens and closes, the edge of the support bar 1a is detected to make a flatly extending surface of the flat plate part 1a2 (see FIGS. 5A to 5C) horizontal so that the support bar 1a is fixed with a jig.

The injection molding die, when it is closed, grips the hollow pipe part 1a1 having a cross section of the support bar 1a in a perfect circular shape. Then, the resin is poured into the closed injection molding die and cooled before the injection molding die is removed, to have the housing 1b integrally fixed to each end of the support bar 1a. The housing 1b may be molded one end of the support bar 1a at a time, or the housings 1b may be molded simultaneously at both ends using a slide die or the like. This completes forming the stabilizer link 1 (see FIGS. 4A to 4C).

The following advantageous effects are obtained from the configuration as described above.

1. Using the resin containing a reinforcement material for the receiving part 1b1 of the stabilizer link 1and the metal pipe allows the stabilizer link 1 to have reduced weight. The stabilizer link 1 has its weight reduced by approximately 30% than a stabilizer link fully made of steel. In addition, the stabilizer link 1 can be made to have weight which is equivalent to that of a stabilizer link fully made of resin, for reducing weight.

2. A bar part of the stabilizer link 1 is a metal pipe such as a steel pipe, and therefore conforms to, for example, steel having a longitudinal elastic modulus of approximately 210 GPa, which is equivalent to a common support bar made of steel, to satisfy the displacement amount (elastic lift amount) with respect to a predetermined load.

3. The edge of each end of the support bar 1a of the stabilizer link 1 is sealed by plastic deformation, by the dimension s1 of approximately 0.5 to 3 mm from the edge toward the center of the support bar, to have the sealing part 1a3 for ensuring the sealing property (airtightness). Accordingly, when cation coating or plating treatment is applied to the surface of the support bar 1a, water and solution are prevented from entering the inside. In addition, at the time of insert molding of the stabilizer link 1, the resin is prevented from infiltrating into the support bar 1a. Further, while the vehicle is actually used, moisture or the like is prevented from entering inside of the stabilizer link 1, to limit degradation over time due to corrosion or the like as much as possible.

4. The support bar 1a of the stabilizer link 1 is plastically deformed at each end to form a flat plate part 1a2 spreading like a spatula from the hollow pipe part 1a1, and then some dimension of the resin closer to the end is larger than that of the resin closer to the center. Therefore, even if a load is applied to the stabilizer link 1 in the axial direction of the support bar 1a toward a direction of removing the housing 1b, the housing 1b never comes off the support bar 1a unless the resin breaks.

5. Forming the flat plate part 1a2 allows, in a case where there is a phase difference between the angles around the axis of the housings 1b arranged at both ends of the support bar 1a, the flat plate part 1a2 on one end to be positioned and used as the reference for molding the flat plate part 1a2 on the other end, thereby facilitating manufacturing.

6. The support bar 1a of the stabilizer link 1 is fastened by molding shrinkage of the resin of the housing 1b, but may have gaps, deviations, or the like due to a difference between linear expansion coefficients of the resin of the housing 1b and the metal material of the support bar 1a. However, arranging the recess lay having a concave shape in the vicinity of the flat plate part 1a2 at the end of the support bar 1a allows for restraining such problems by the physical anchor effect.

7. The resin forming the housing 1b is molded to have a thickness of approximately 3 to 4 mm and the flange parts 1f1, 1f2, 1f3 are arranged around the receiving hole 1b3 (see FIG. 4C), to secure strength of the wall plate forming the receiving hole 1b3 to which an external force is applied.

8. As shown in FIGS. 4A to 4C, the reinforcing ribs r1, r2, r3 are formed as vertical walls about the axial center of the flange parts 1f1, 1f2, 1f3 in a disk shape. In addition, the resin forming the flange parts 1f1, 1f2, 1f3 along with the reinforcing ribs r3 crosses the edge of the support bar 1a by the length of the dimension s5 (approximately 2 mm or more) (see FIG. 4A) toward the center thereof. This improves the rigidity of the root part of the resin forming the receiving hole 1b3 against a force in the axial direction of the receiving hole 1b3 of the housing 1b (load of removing or pushing the ball stud 10, or the like). In addition, the resin forming the receiving hole 1b3 smoothly continues to the resin closer to the support bar 1a.

9. The resin forming the housing 1b contains a reinforcing material such as fine fibers of fiberglass, to increase strength of the housing 1b and make the housing 1b lightweight, and does not affect the life of the injection molding machine.

The advantageous effects as described above allow the stabilizer link 1 to achieve small displacement amount and light weight yet high strength.

Second Embodiment

FIG. 7A is a top view of a stabilizer link of a second embodiment, FIG. 7B is a view as seen from the direction of an arrow F in FIG. 7A, and FIG. 7C is a cross-sectional view taken along a line G-G in FIG. 7A. A stabilizer link 1A of the second embodiment includes two flange parts 21f1, 21f2 that are formed to surround a receiving hole 21b3 of a housing 21b. In addition, a reinforcing rib 2r like a brace is included between a bottom wall 21b t of the receiving hole 21b3 of the housing 21b and the flat plate part 1a2 and tapered part 1a4 of the support bar 1a.

Other components are the same as those of the first embodiment, and then like components are denoted by the same reference numerals to have no detailed description thereof provided.

The housing 21b of the second embodiment includes a receiving part 21b1 and a fixing part 21b2. The receiving part 21b1 is formed to have the receiving hole 21b3 in a bottomed cylindrical shape in which the main body portion 12a of the ball seat 12 and the ball portion 10b of the ball stud 10 are received.

The sealing part 1a3, flat plate part 1a2, tapered part 1a4, and part of the hollow pipe part 1a1 of the support bar 1a are fixed in the fixing part 21b2. The two flange parts 21f1, 21f2 in a disk shape (see FIG. 7B) are formed in the receiving part 21b1 so as to continue to the outer side of the peripheral wall around the receiving hole 21b3. The reinforcing ribs r, r1, r2, r3 for increasing strength are formed between the flange parts 21f1, 21f2 so as to connect the flange part 21f1 with the flange part 21f2. The flange parts 21f1, 21f2 and the reinforcing ribs r, r1, r2, r3 are formed to withstand external forces applied from the ball part 10b of the ball stud 10.

The stabilizer link 1A has the two flange parts 21f1, 21f2 formed in the housing 21b, based on a short dimension s6 of the height of the housing 21b. Additionally, the reinforcing rib 2r like a brace is formed between the bottom wall 21bt forming the receiving hole 21b3 of the housing 21b and the resin covering the flat plate part 1a2 and tapered part 1a4 of the support bar 1a, so as to extend downward (lower side of the drawing sheet in FIG. 7B) in the axial direction of the receiving hole 21b3 for increasing strength.

According to the second embodiment, the flange parts 21f1, 21f2 and the reinforcing rib 2r are arranged to improve rigidity of the root part of the resin forming the receiving hole 21b3 against a force in the axial direction of the receiving hole 21b3 of the housing 21b (load of removing or pushing the ball stud 10, or the like). In addition, the advantageous effects of the first embodiment are similarly achieved.

FIG. 8A is a top view of a stabilizer link according to another example of the second embodiment, FIG. 8B is a view as seen in the direction of an arrow I in FIG. 8A, FIG. 8C is a cross-sectional view taken along a line J-J in FIG. 8A, and FIG. 8D is a cross-sectional view taken along a line K-K in FIG. 8A.

The stabilizer link 1A1 of another example of the second embodiment has a distance s7 between an inner peripheral wall surface 21b4 of the receiving hole 21b3 of the housing 21b and the sealing part 1a3 at the edge of the support bar 1a set to as close as approximately 3 to 4 mm, and the gap therebetween is filled with, or formed to contain, resin.

In addition, no reinforcing rib like a brace is formed between the bottom wall 21bt of the receiving hole 21b3 of the housing 21b and the flat plate part 1a2 and tapered part 1a4 of the support bar 1a.

This is because the edge of the support bar 1a is made closer to the receiving hole 21b3 of the housing 21b to allow a resin peripheral wall 21s defining the receiving hole 21b3 to assume the role of the reinforcing rib. That is, the role and feature of the reinforcing rib like a brace is assumed by part of the peripheral wall 21s of the receiving hole 21b3 which faces the support bar 1a.

Further, as shown in FIGS. 8A, 8B, and 8D, the resin covering the flat plate part 1a2 and tapered part 1a4 of the support bar 1a of the housing 21b is formed therealong with four escaping parts 21n1, 21n2, 21n3, 21n4 each being a space in a flat substantially-rectangular-parallelepiped shape. The escaping parts 21n1, 21n2, 21n3, 21n4 are formed in parts of the flat plate part 1a2 and tapered part 1a4 so as to vertically and horizontally face each other and to have substantially the same thickness of the resin from facing surfaces of the parts of the flat plate part 1a2 and tapered part 1a4 (see FIG. 8B).

Other components are the same as those of the second embodiment, and then like components are denoted by the same reference numerals to have no detailed description thereof provided.

According to another example of the second embodiment, the distance (shortest distance) s7 between the inner peripheral wall surface 21b4 of the receiving hole 21b3 of the housing 21b, to which a load (external force) is applied, and the edge of the support bar 1a as the reinforcing member is set to as close as approximately 3 to 4 mm, to more directly transmit the load (external force) received in the receiving hole 21b3 to the support bar 1a having a feature of withstanding the load. This helps improve strength of withstanding a load and/or fatigue strength (or fatigue limit) of the stabilizer link 1A1 as a whole.

Furthermore, as the distance s7 between the receiving hole 21b3 of the housing 21b, to which a load (external force) is applied, and the edge of the support bar 1a is short, bending stress is reduced that is generated between the receiving hole 21b3 of the housing 21b and the support bar 1a. This reduces stress generated in the resin between the receiving hole 21b3 of the housing 21b and the support bar 1a, and to restrain deterioration of the housing 21b due to repeated loading thereto. Accordingly, the life of the housing 21b is prolonged.

Further, as described above, the housing 21b having a flexural modulus of approximately 6 GPa and the support bar 1a having a longitudinal elasticity modulus of approximately 210 GPa, for example, are largely different from each other in terms of stretch amount with respect to the same load. Then, if the distance between the receiving hole 21b3 of the housing 21b, which receives a load, and the support bar 1a is short, the deformation amount of the support bar 1a is smaller than that of the housing 21b to cause a large stress to be generated in the resin at the boundary between the receiving hole 21b3 of the housing 21b and the support bar 1a, potentially leading to breakage.

Therefore, in the present embodiment, the escaping parts 21n1, 21n2, 21n3, 21n4 each being a space in a flat substantially-rectangular-parallelepiped shape are formed in the resin at the boundary between the receiving hole 21b3 of the housing 21b and the support bar 1a. This allows the resin at the boundary therebetween to be deformed more easily so as to escape the stress to the resin at the boundary by deformation. Accordingly, this restrains stress from being excessively generated or distributed stress from increasing, to avoid breakage of the resin at the boundary. As a result, the stress to the housing 21b is reduced to prolong the life of the stabilizer link 1A.

First Modification

Figure 9A:
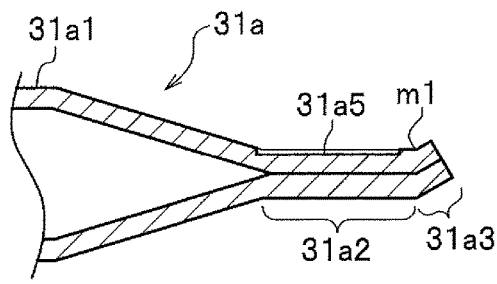
FIG. 9A is an enlarged view of an area, corresponding to the area E in FIG. 5B, of a support bar according to a first modification of the present invention.
Figure 9B:
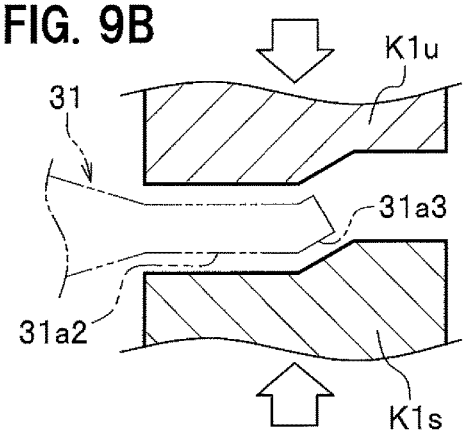
FIG. 9B is an enlarged view of an area, corresponding to the area E in FIG. 5B, in a state of a flat plate part and a sealing part of the support bar of the first modification being formed.

FIG. 9A is an enlarged view of an area, corresponding to the area E in FIG. 5B, of a support bar according to a first modification of the present invention, and FIG. 9B is an enlarged view of an area, corresponding to the area E in FIG. 5B, in a state of a flat plate part and a sealing part of the support bar of the first modification being formed. A support bar 31a of the first modification in FIG. 9A is formed by bending a sealing part 31a3 with a single bend.

The support bar 31a has at each end, as in the first embodiment, a flat plate part 31a2 arranged on the outer side of a hollow pipe part 31a1 and further the sealing part 31a3 arranged on the outer side of the flat plate part 31a2. A recess 31a5 is formed in the flat plate part 31a2. The sealing part 31a3 is formed by bending the outer side of the flat plate part 31a2 with a first bend m1.

As shown in FIG. 9B, the flat plate part 31a2 and sealing part 31a3 of the support bar 31a are formed by pressing (and bending) a pipe material with a lower die K1s and an upper die K1u toward the respective directions as indicated by hollow arrows. Note that the recess 31a5 may be formed at the same time as the flat plate part 31a2 and sealing part 31a3, or may independently be formed.

In order to measure a sealing property of the sealing part 31a3 of the support bar 31a, the sealing part 31a3 of the support bar 31a was submerged in water and then air having a pressure of 0.5 Pa was sent from the hollow pipe part 31a1, to find that the sealing part 31a3 had no leakage therefrom and then it is surely sealed.

Second Modification

Figure 10A:
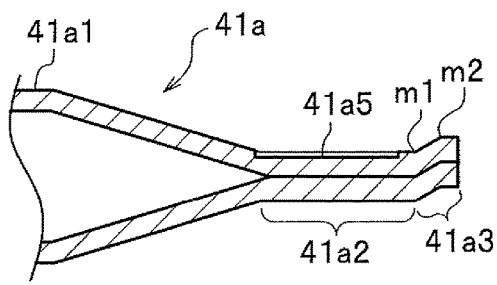
FIG. 10A is an enlarged view of an area, corresponding to the area E in FIG. 5B, of a support bar according to a second modification of the present invention.
Figure 10B:
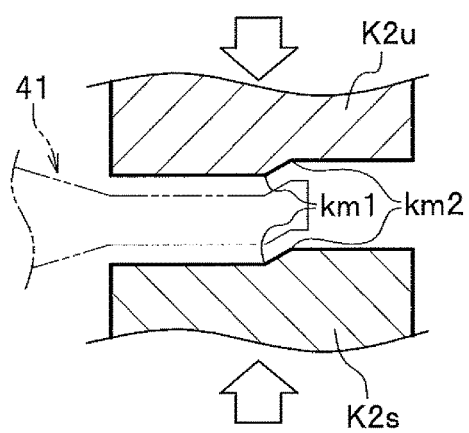
FIG. 10B is an enlarged view of an area, corresponding to the area E in FIG. 5B, in a state of a flat plate part and a sealing part of the support bar of the second modification being formed.

FIG. 10A is an enlarged view of an area, corresponding to the area E in FIG. 5B, of a support bar according to a second modification of the present invention, and FIG. 10B is an enlarged view of an area, corresponding to the area E in FIG. 5B, in a state of a flat plate part and a sealing part of the support bar of the second modification being formed. A support bar 41a of the second modification in FIG. 10A is formed by bending a sealing part 41a3 with two bends.

The support bar 41a has at each end, as in the first embodiment, a flat plate part 41a2 arranged on the outer side of a hollow pipe part 41a1 and further the sealing part 41a3 arranged on the outer side of the flat plate part 41a2. A recess 41a5 is formed in the flat plate part 41a2. The sealing part 41a3 is formed by bending the outer side of the flat plate part 41a2 with the first bend m1 and a second bend m2.

As shown in FIG. 10B, the flat plate part 41a2 and sealing part 41a3 of the support bar 41a are formed by pressing (and bending) a pipe material with a lower die K2s and an upper die K2u, each having a first bending part km1 and a second bending part km2, toward the respective directions as indicated by hollow arrows. Note that the recess 41a5 may be formed at the same time as the flat plate part 41a2 and sealing part 41a3, or may independently be formed.

The sealing part 41a3 of the support bar 41a of the second modification has one more bend applied as compared with the sealing part 31a3 of the first modification, to have additionally sealed portions so that the sealing property (airtightness) is further improved.

Third Modification

Figure 11A:
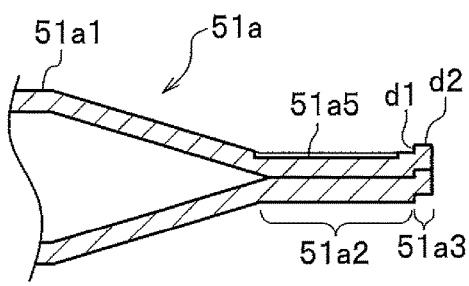
FIG. 11A is an enlarged view of an area, corresponding to the area E in FIG. 5B, of a support bar according to a third modification of the present invention.
Figure 11B:
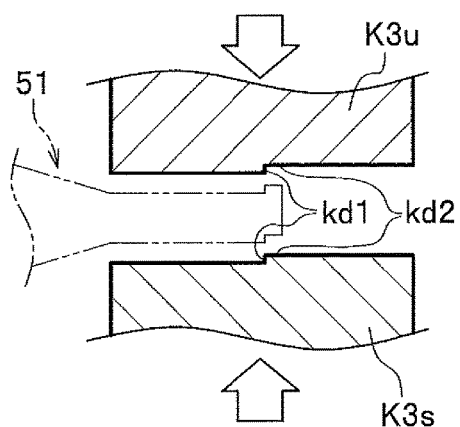
FIG. 11B is an enlarged view of an area, corresponding to the area E in FIG. 5B, in a state of a flat plate part and a sealing part of the support bar of the third modification being formed.

FIG. 11A is an enlarged view of an area, corresponding to the area E in FIG. 5B, of a support bar according to a third modification of the present invention, and FIG. 11B is an enlarged view of an area, corresponding to the area E in FIG. 5B, in a state of a flat plate part and a sealing part of the support bar of the third modification being formed. A support bar 51a of the third modification in FIG. 11A is obtained by changing the first and second bends m1, m2 of the sealing part 41a3 of the second modification to a stepped structure.

The support bar 51a has at each end, as in the first embodiment, a flat plate part 51a2 arranged on the outer side of a hollow pipe part 51a1 and further the sealing part 51a3 arranged on the outer side of the flat plate part 51a2. A recess 51a5 is formed in the flat plate part 51a2. The sealing part 51a3 of the support bar 51a has a stepped structure having a vertical part d1 and a horizontal part d2.

The vertical part d1 rises substantially vertically from the flat plate part 51a2 extending in the longitudinal direction of the support bar 51a. The horizontal part d2 is substantially perpendicular to the vertical part d1 to run along the longitudinal direction of the support bar 51a from an upper end of the vertical part d1.

As shown in FIG. 11B, the flat plate part 51a2 and sealing part 51a3 of the support bar 51a are formed by pressing (and bending) a pipe material with a lower die K3s and an upper die K3u, each having a step edge surface kd1 and a step surface kd2, toward the respective directions as indicated by hollow arrows.

The sealing part 51a3 of the support bar 51a of the third modification has additionally one more bend having a sealing property and are bent at more acute angles due to a stepped shape, as compared with the sealing part 31a3 of the first modification, to have a further improved sealing property (airtightness).

Fourth Modification

In the first, second, and third modifications, the sealing part 1a3 of the first or second embodiment, which has a shape of the edge thereof being crushed by plastic deformation, is replaced by the respective sealing parts 31a3, 41a3, 51a3 which are formed to have a bent or stepped shape, but a support bar may be formed to include both a sealing part having a shape of the edge thereof being crushed by plastic deformation and the sealing part 31a3, 41a3, or 51a3 having a bent or stepped shape.

That is, a first sealing part 31a3, 41a3, or 51a3 having a bent shape or a stepped shape may be formed on the outer side of the flat plate part 1a2 of a support bar, and then a second sealing part having a shape of an edge of the support bar being crushed by plastic deformation may be formed on the outer side of the first sealing portions 31a3, 41a3, or 51a3. Alternatively, a first sealing part having a shape of an edge of a support bar being crushed by plastic deformation may be formed on the outer side of a flat plate part of the support bar, and then a second sealing part having a bent or stepped shape may be formed in the first sealing part.

Fourth modification is formed to include the first and second sealing parts, each having a shape of the edge of the support bar being crushed by plastic deformation or a bent or stepped shape, and therefore the sealing property (airtightness) is further improved.

Fifth Modification

Figure 12A:
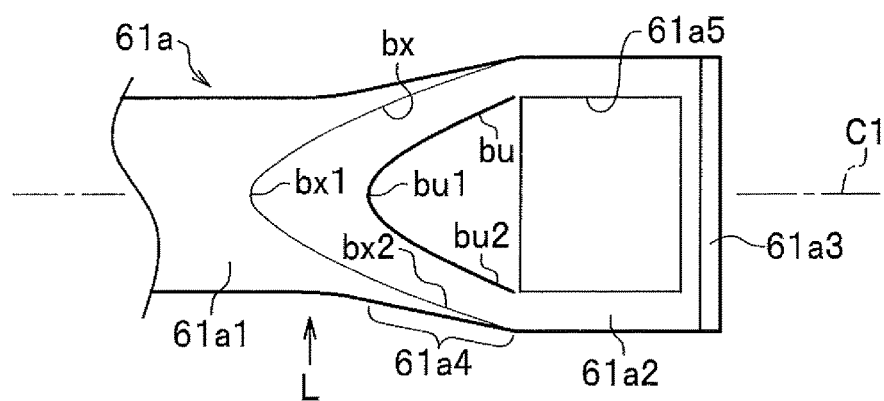
FIG. 12A is an enlarged view of an area, corresponding to an area H in FIG. 5A, of a support bar according to a fifth modification of the present invention.
Figure 12B:
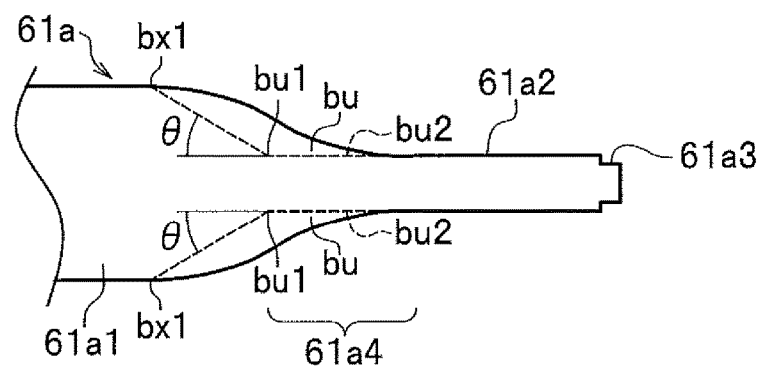
FIG. 12B is a view as seen in the direction of an arrow L in FIG. 12A.
Figure 13:
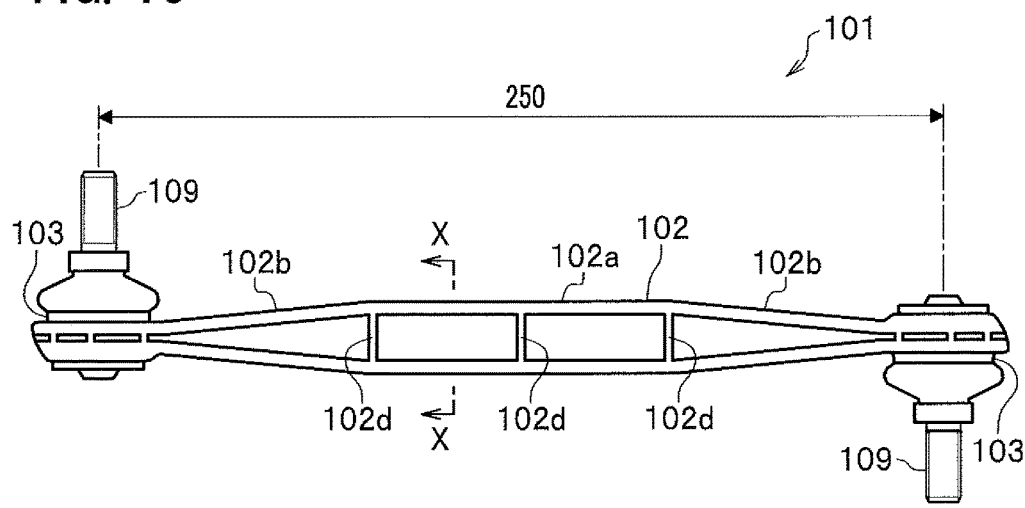
FIG. 13 is a front view of a resin stabilizer link in a related art.
Figure 14A:
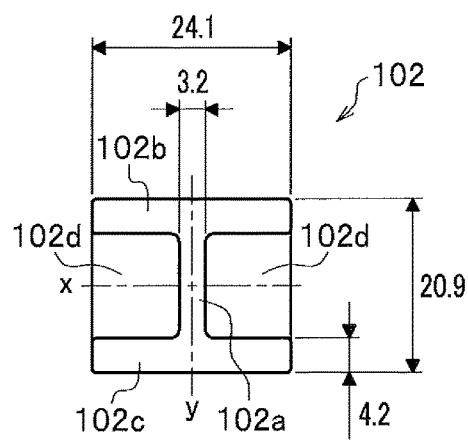
FIGS. 14A and 14B are cross-sectional views taken along a line X-X in FIG. 13.
Figure 14B:
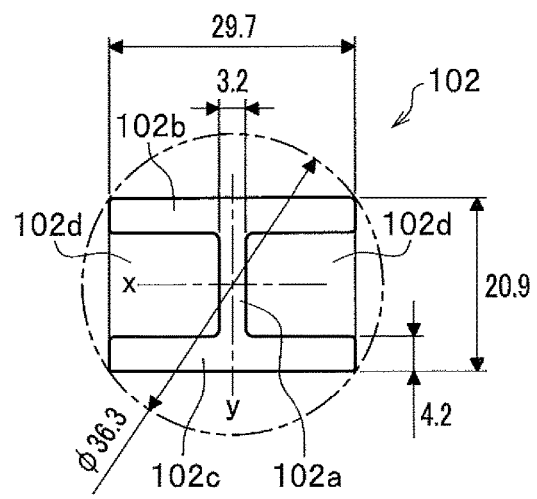

FIG. 12A is an enlarged view of an area, corresponding to an area H in FIG. 5A, of a support bar according to a fifth modification of the present invention, and FIG. 12B is a view as seen in the direction of an arrow L in FIG. 12A. A support bar 61a of the fifth modification is made from a pipe material by forming a flat plate part 61a2 on the outer side of a hollow pipe part 61a1 as follows.

That is, a tapered part 61a4 between the hollow pipe part 61a1 and the flat plate part 61a2 is formed to have a boundary having a curvature such that the boundary comes closer in the longitudinal direction to the center of the support bar 61a as it comes closer in the lateral direction to a center axis C1 (see FIG. 12A), while the boundary comes closer in the longitudinal direction to an edge of the support bar 61a as it comes more distant in the transverse direction from the center axis C1.

In other words, a boundary bu between the flat plate part 61a2 and the tapered part 61a4 is formed to have a curvature such that a boundary bu1 in the center in the transverse direction extends in the longitudinal direction toward the center of the support bar 61a, while a boundary bu2 at an end of the boundary in the transverse direction extends in the longitudinal direction toward the edge of the support bar 61a.

Similarly, a boundary bx between the hollow pipe part 61a1 and the tapered part 61a4 is formed to have a curvature such that a boundary bx1 in the center in the transverse direction extends in the longitudinal direction toward the center of the support bar 61a, while a boundary bx2 at an end of the boundary in the transverse direction extends in the longitudinal direction toward the edge of the support bar 61a.

Here, an angle θ between the flat plate part 61a2 and an inclining part of the tapered part 61a4 from the flat plate part 61a2 (see FIG. 12B) is preferably set to 15 to 60 degrees. If the angle θ is less than 15 degrees, the tapered part 61a4 becomes too long. On the contrary, if the angle θ exceeds 60 degrees, the angle between the tapered part 61a4 and the flat plate part 61a2 is steep to have a risk of stress concentration. Note that the angle θ (see FIG. 12B) is most preferably set to 30 to 45 degrees. Setting the angle θ to 30 to 45 degrees allows for transitioning from the hollow pipe part 61a1 to the flat plate part 61a2 in a short distance to effectively restrain stress concentration.

According to the fifth modification, the boundaries bu, bu2 between the hollow pipe part 61a1 and the flat plate part 61a2 of the support bar 61a are formed to have the curvature as in FIGS. 12A and 12B for reducing stress concentration, and as a result, material strength against stretching and bending forces, and/or fatigue strength (or fatigue limit) is/are increased. This improves reliability on durability of the stabilizer link 1.

Other Embodiments

1. Various configurations have been described in the first and second embodiments as well as the first to fifth modifications, but some of these configurations may be selected and combined as appropriate.

2. The bending parts described in the first to fourth modifications may be formed so as to be bent zigzag in the longitudinal direction of the support bars 31a, 41a, 51a, and are not necessarily bent perpendicular to the longitudinal direction of the support bars 31a, 41a, 51a.

3. In the first to fourth modifications, the sealing parts 31a3, 41a3, 51a3 are formed by bending the respective flat plate parts once or twice, but a sealing part may be formed by bending a flat plate part three or more times.

4. Note that the present invention is not limited to the first and second embodiments as well as the first to fifth modifications, and includes various embodiments. For example, the above-described embodiments are those for illustrating the present invention, and are not necessarily limited to those having all the components as described. For example, an embodiment may partially include the components as described above. In addition, various forms are possible within the scope of appended claims.

The invention claimed is:

1. A link arm member for use in a vehicle for connecting a suspension and a stabilizer, comprising:
a support bar that is a hollow metal pipe sealed at each end thereof; and
a housing made of resin that is arranged at each end of the support bar and has a receiving hole for receiving a ball part of a ball stud to which the suspension or the stabilizer is fixed,
wherein
the support bar includes a first sealing part at each edge thereof that is plastically deformed for sealing so as to have a thickness 10% to 35% thinner than the wall thickness of a pipe material to be deformed.

2. A link arm member for use in a vehicle for connecting a suspension and a stabilizer, comprising:
a support bar that is sealed at each end thereof; and
a housing made of resin that is arranged at each end of the support bar and has a receiving hole for receiving a ball part of a ball stud to which the suspension or the stabilizer is fixed,
wherein
the support bar includes a second sealing part at each end thereof that is in a shape of being bent zigzag one or more times.

3. A link arm member for use in a vehicle for connecting a suspension and a stabilizer, comprising:
a support bar that is a hollow metal pipe sealed at each end thereof; and
a housing made of resin that is arranged at each end of the support bar and has a receiving hole for receiving a ball part of a ball stud to which the suspension or the stabilizer is fixed,
wherein
the housing includes flange parts that are annularly formed to continue outward from the peripheral wall defining the receiving hole.

4. A link arm member for use in a vehicle for connecting a suspension and a stabilizer, comprising:
a support bar that is a hollow metal pipe sealed at each end thereof; and
a housing made of resin that is arranged at each end of the support bar and has a receiving hole for receiving a ball part of a ball stud to which the suspension or the stabilizer is fixed,
wherein
the support bar has its end covered with resin forming the housing, and
the housing is formed to have a smaller thickness of resin, around the peripheral wall of the receiving hole, with the increasing distance from the edge of the support bar toward the center thereof in the longitudinal direction, and to have substantially the same thickness at a position 2 mm or more apart from the edge inward as that of the resin covering the support bar from that position inward to the end of the housing.

5. A link arm member for use in a vehicle for connecting a suspension and a stabilizer, comprising:
a support bar that is a hollow metal pipe sealed at each end thereof; and
a housing made of resin that is arranged at each end of the support bar and has a receiving hole for receiving a ball part of a ball stud to which the suspension or the stabilizer is fixed,
wherein
the support bar has its end covered with resin forming the housing, and
the housing includes a reinforcing ribs like a brace between the bottom wall of the receiving hole and the resin covering the support bar.

6. A link arm member for use in a vehicle for connecting a suspension and a stabilizer, comprising:

a support bar that is a hollow metal pipe sealed at each end thereof; and a housing made of resin that is arranged at each end of the support bar and has a receiving hole for receiving a ball part of a ball stud to which the suspension or the stabilizer is fixed, wherein the support bar has its end covered with resin forming the housing, and the link arm member has a gap of 2 to 3 mm between the resin forming the peripheral wall of the receiving hole and the resin covering the support bar.

* * * * *